US010763719B2

(12) United States Patent
Hashimoto et al.

(10) Patent No.: US 10,763,719 B2
(45) Date of Patent: Sep. 1, 2020

(54) STATOR

(71) Applicant: AISIN AW CO., LTD., Anjo-shi, Aichi-ken (JP)

(72) Inventors: Shingo Hashimoto, Okazaki (JP); Shingo Sato, Okazaki (JP); Junichi Yokota, Nagoya (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/323,978

(22) PCT Filed: Sep. 29, 2017

(86) PCT No.: PCT/JP2017/035448
§ 371 (c)(1),
(2) Date: Feb. 7, 2019

(87) PCT Pub. No.: WO2018/079187
PCT Pub. Date: May 3, 2018

(65) Prior Publication Data
US 2019/0214874 A1 Jul. 11, 2019

(30) Foreign Application Priority Data
Oct. 25, 2016 (JP) .................. 2016-208325

(51) Int. Cl.
*H02K 3/50* (2006.01)
*H02K 3/04* (2006.01)
(Continued)

(52) U.S. Cl.
CPC ............. *H02K 3/50* (2013.01); *H02K 1/16* (2013.01); *H02K 1/165* (2013.01); *H02K 3/04* (2013.01);
(Continued)

(58) Field of Classification Search
CPC .. H02K 3/50; H02K 3/04; H02K 3/34; H02K 1/16; H02K 3/38; H02K 3/12; H02K 1/165; H02K 3/48; H02K 1/18; H02K 1/06
(Continued)

(56) References Cited

U.S. PATENT DOCUMENTS

2012/0217836 A1\* 8/2012 Watanabe ............... H02K 3/12
310/207

FOREIGN PATENT DOCUMENTS

| JP | 2012-125043 A | 6/2012 |
|----|---------------|--------|
| JP | 2013-5541 A | 1/2013 |

(Continued)

OTHER PUBLICATIONS

Machine Translation, Hashimoto, JP-2017050937-A, Mar. 2017. (Year: 2017).\*
(Continued)

*Primary Examiner* — Thomas Truong
(74) *Attorney, Agent, or Firm* — Oliff PLC

(57) ABSTRACT

A stator that includes a stator core having a fastening hole; and a plurality of coils arranged in slots of the stator core and each formed of a conductor wire, wherein each of the coils includes lead wires at ends of the conductor wire, and a plurality of connectors, which are portions where the lead wires of the plurality of coils are connected to each other, are arranged so as not to overlap the fastening hole in a state in which a distance between the connector adjacent to the fastening hole in a circumferential direction of the stator core when viewed in a rotation axis direction and the connector adjacent to the connector on a side opposite to the fastening hole side out of the connectors is smaller than a distance between the connectors other than the connector adjacent to the fastening hole.

20 Claims, 10 Drawing Sheets

(51) Int. Cl.
  *H02K 1/16* (2006.01)
  *H02K 3/48* (2006.01)
  *H02K 3/12* (2006.01)
  *H02K 3/38* (2006.01)
  *H02K 3/34* (2006.01)

(52) U.S. Cl.
  CPC ............... *H02K 3/12* (2013.01); *H02K 3/34* (2013.01); *H02K 3/38* (2013.01); *H02K 3/48* (2013.01)

(58) Field of Classification Search
  USPC ............ 310/179, 180, 184, 195, 201, 208, 310/216.083, 216.084, 216.127, 216.128, 310/413, 414, 415
  See application file for complete search history.

(56) References Cited

FOREIGN PATENT DOCUMENTS

| | | |
|---|---|---|
| JP | 2015-216788 A | 12/2015 |
| JP | 2016-73120 A | 5/2016 |
| JP | 2017-50937 A | 3/2017 |
| JP | 2017050937 A * | 3/2017 |

OTHER PUBLICATIONS

Dec. 26, 2017 International Search Report issued in International Patent Application PCT/JP2017/035448.

\* cited by examiner

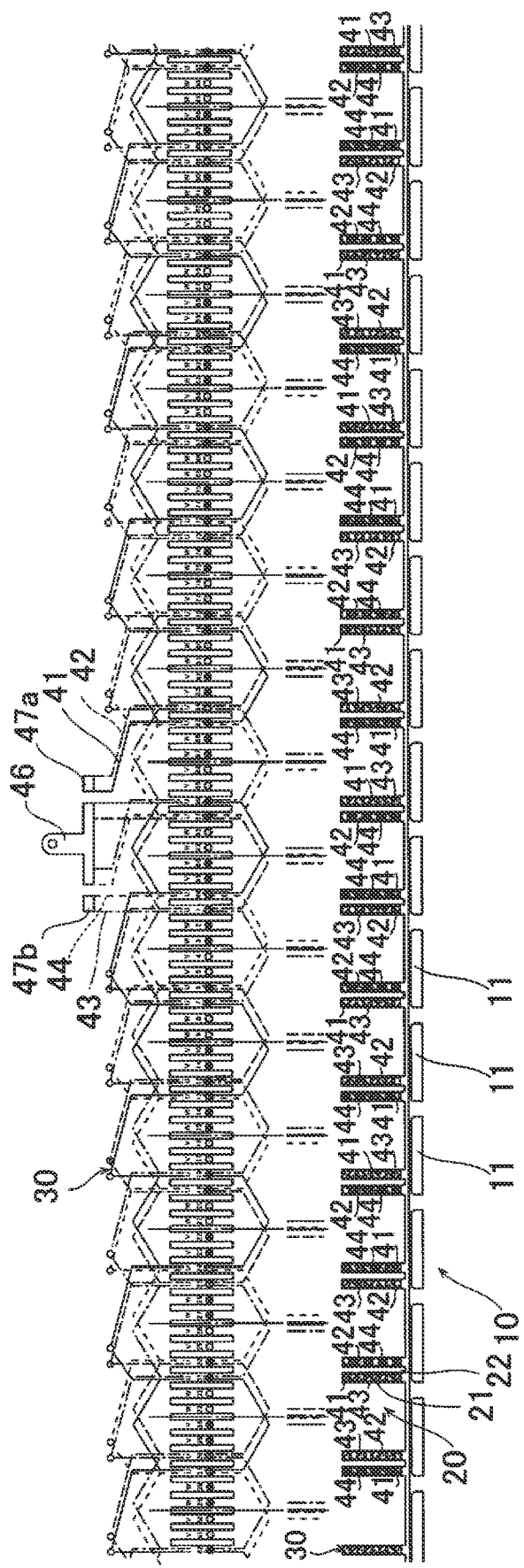

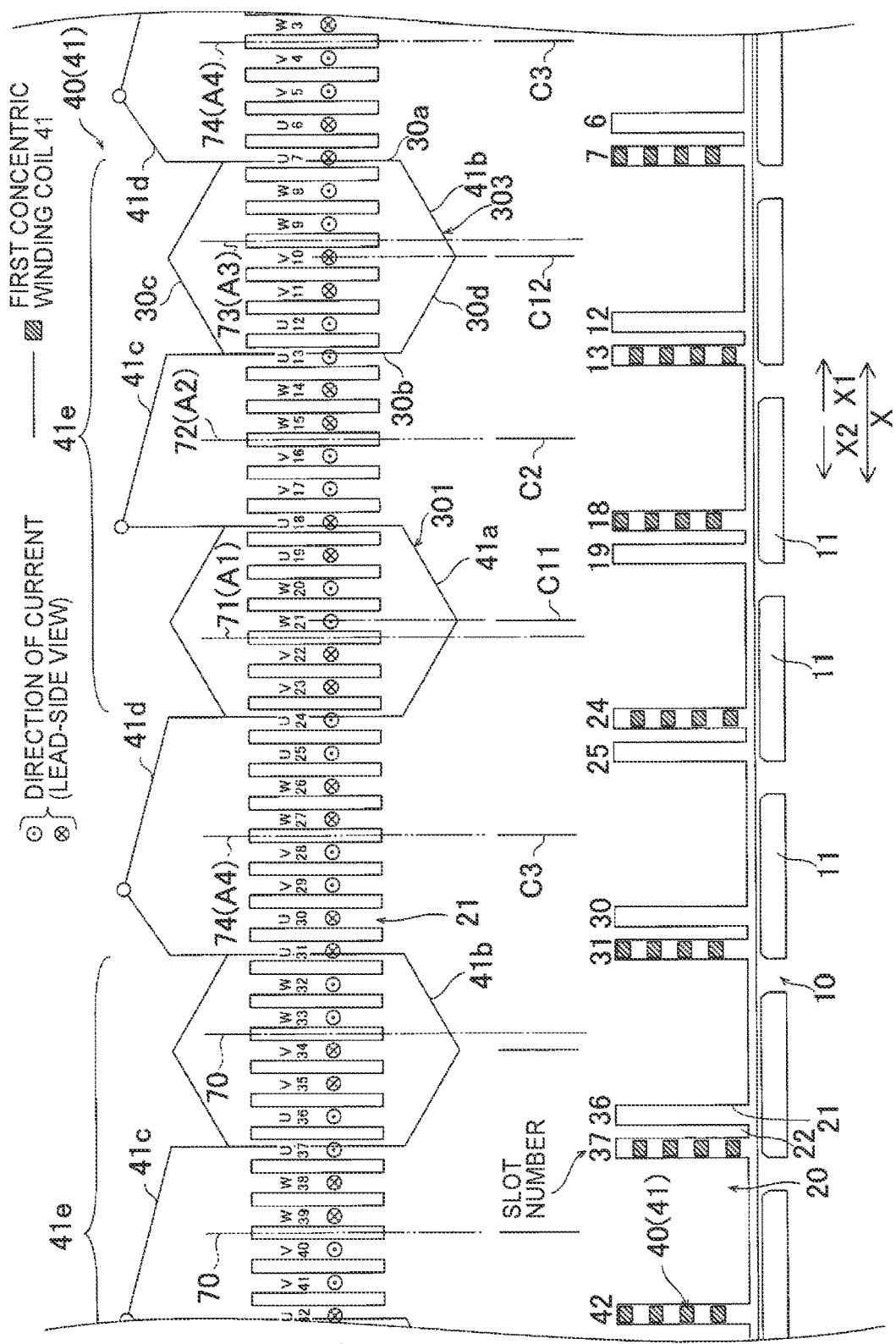

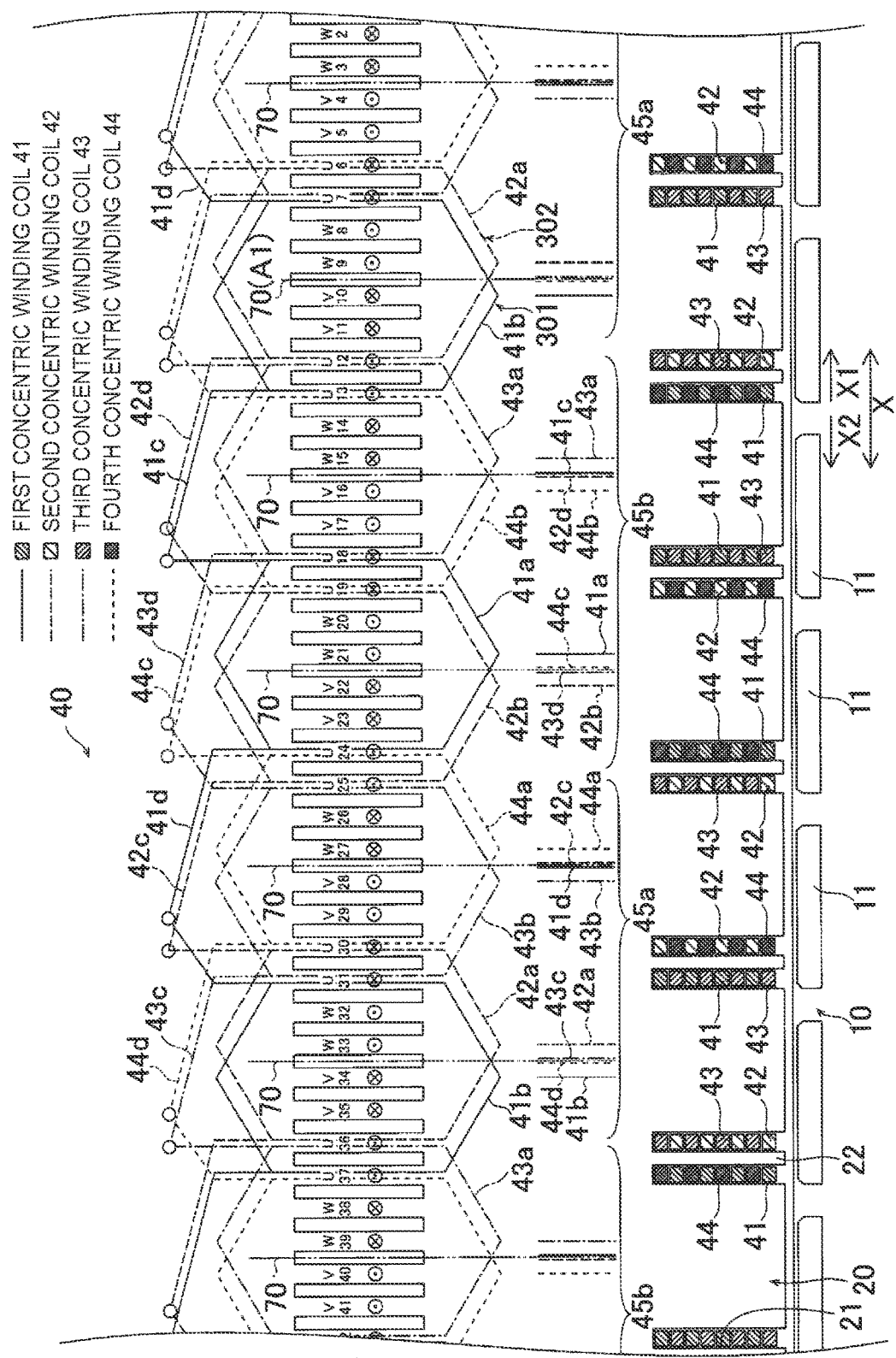

STATOR

BACKGROUND

The present disclosure relates to a stator.

Hitherto, there is known a stator including a stator core having a fastening hole into which a fastener is inserted. For example, this stator is disclosed in Japanese Patent Application Publication No. 2012-125043 (JP 2012-125043 A).

In the stator described in Japanese Patent Application Publication No. 2012-125043 (JP 2012-125043 A), bolt holes (fastening holes) are provided on a radially outer side of the stator core (radially outer side of a yoke). The stator is attached to a motor case or the like by inserting bolts into the bolt holes. A plurality of concentric winding coils are attached to slots of the stator. The concentric winding coil is formed by concentrically winding a flat rectangular conductor wire. Lead wire portions are provided at a winding start portion and a winding end portion of the concentric winding coil. The ends (connecting portions) of the lead wire portions are arranged on the radially outer side of the stator core so as to extend radially outward. In the stator described in Japanese Patent Application Publication No. 2012-125043 (JP 2012-125043 A), the bolt holes (fastening holes) of the stator core are provided on a radially outer side with respect to the ends of the lead wire portions so as not to overlap the lead wire portions when viewed in a rotation axis direction. When viewed in the rotation axis direction, the distances between the ends (connecting portions) of the lead wire portions in a circumferential direction of the stator core are substantially equal to each other among the plurality of lead wire portions.

SUMMARY

In the stator described in Japanese Patent Application Publication No. 2012-125043 (JP 2012-125043 A), the bolt holes (fastening holes) of the stator core are provided on the radially outer side with respect to the ends of the lead wire portions so as not to overlap the lead wire portions when viewed in the rotation axis direction. In order to keep the size of the stator core within a predetermined size range, it is necessary to reduce the diameter of a portion of the stator core other than the bolt holes (portion that structures the slots and the yoke). As a result, a problem arises in that the power of the motor (rotating electrical machine) decreases.

An exemplary aspect of the disclosure provides a stator in which a decrease in power of a rotating electrical machine can be prevented while keeping the size of a stator core within a predetermined size range.

A stator according to one aspect of the present disclosure includes a stator core having, on a radially outer side, a fastening hole into which a fastener is inserted, and a plurality of coils arranged in slots of the stator core and each formed of a conductor wire. Each of the coils includes lead wires at ends of the conductor wire. A plurality of connectors, which are portions where the lead wires of the plurality of coils are connected to each other, are arranged so as not to overlap the fastening hole in a state in which a distance between the connector adjacent to the fastening hole in a circumferential direction of the stator core when viewed in a rotation axis direction and the connector adjacent to the connector on a side opposite to the fastening hole side out of the connectors is smaller than a distance between the connectors other than the connector adjacent to the fastening hole.

In the stator according to one aspect of the present disclosure, as described above, the plurality of connectors which are portions where the lead wires of the plurality of coils are connected to each other, are arranged so as not to overlap the fastening hole in the state in which the distance between the connector adjacent to the fastening hole in the circumferential direction of the stator core when viewed in the rotation axis direction and the connector adjacent to the connector on the side opposite to the fastening hole side out of the connectors is smaller than the distance between the connectors other than the connector adjacent to the fastening hole. Therefore, the fastening hole can be arranged between the connectors in the circumferential direction of the stator core when viewed in the rotation axis direction. Thus, the diameter of a portion of the stator core other than the fastening hole (portion that structures the slots and a yoke) can be increased as compared to a case where the fastening hole is arranged on the radially outer side with respect to the connectors. As a result, the decrease in the power of the rotating electrical machine can be prevented while keeping the size of the stator core within the predetermined size range.

Effects of the Disclosure

According to the present disclosure, as described above, the decrease in the power of the rotating electrical machine can be prevented while keeping the size of the stator core within the predetermined size range.

BRIEF DESCRIPTION OF THE DRAWINGS

FIG. 3 is a diagram illustrating a state in which U-phase concentric winding coils are arranged in slots according to the embodiment of the present disclosure.

FIG. 4 is a partially enlarged view of FIG. 3, illustrating only first concentric winding coils.

FIG. 5 is a partially enlarged view of FIG. 3.

DETAILED DESCRIPTION OF EMBODIMENTS

An embodiment of the present disclosure is described below with reference to the drawings.

Embodiment (Structure of Rotating Electrical Machine)

The structure of a rotating electrical machine 100 according to this embodiment is described with reference to FIG. 1 to FIG. 12.

Figure 1:
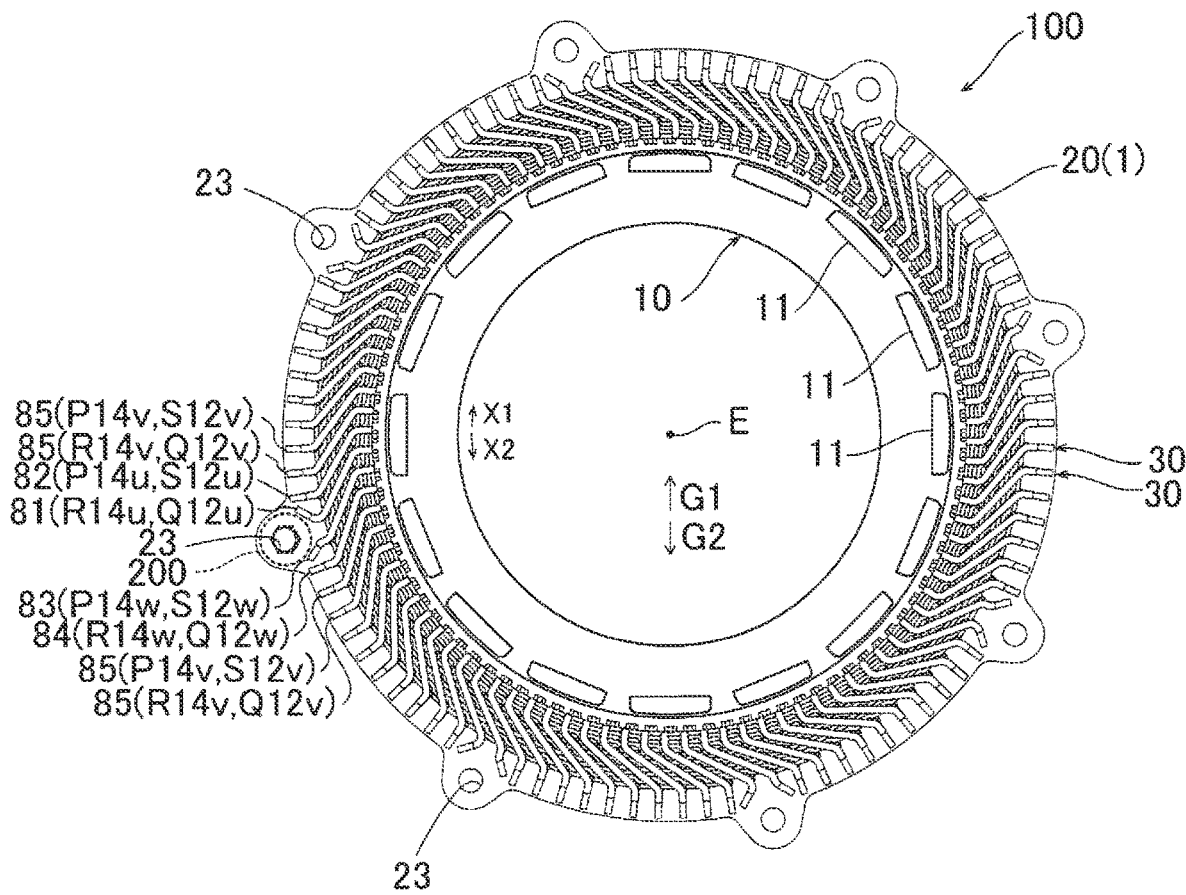
FIG. 1 is a plan of a rotating electrical machine according to one embodiment of the present disclosure.

A "rotation axis direction" herein refers to a direction along a rotation axis of a stator core 20 (rotor core 10) (E direction, that is, direction perpendicular to the drawing sheet; see FIG. 1) in a state in which the rotating electrical machine 100 is completed. A "circumferential direction" refers to a circumferential direction of the stator core 20 (X1 direction or X2 direction; see FIG. 1) in the state in which the rotating electrical machine 100 is completed. A "radially inner side" refers to a direction to the center of the stator core 20 (G1 direction; see FIG. 1) in the state in which the rotating electrical machine 100 is completed. A "radially outer side" refers to a direction to the outside of the stator core 20 (G2 direction; see FIG. 1) in the state in which the rotating electrical machine 100 is completed.

As illustrated in FIG. 1, the rotating electrical machine 100 includes the rotor core 10. The rotor core 10 is provided with a plurality of (for example, 16) permanent magnets 11 along the circumferential direction. The plurality of permanent magnets 11 are provided substantially equiangularly (at intervals of about 22.5°) along the circumferential direction of the rotor core 10.

The rotating electrical machine 100 includes a stator 1 (stator core 20). The stator core 20 is arranged so as to face the rotor core 10 in the radial direction. The stator core 20 is provided with a plurality of (for example, 96) slots 21 (see FIG. 3). The slot 21 is an open-type slot that is open to the radially inner side. Concentric winding coils 30 described later, which are arranged on an inner side of the stator core 20, are structured to be attached to the slots 21 by being moved from the radially inner side to the radially outer side of the stator core 20. Teeth 22 (see FIG. 3) are each provided between adjacent slots 21. An insulating member (not illustrated) is arranged between the tooth 22 and the concentric winding coil 30 arranged in the slot 21.

Fastening holes 23 into which bolts 200 are inserted are provided on the radially outer side of the stator core 20. The stator core 20 is formed by stacking a plurality of steel sheets provided with holes serving as the fastening holes 23 on the radially outer side. The fastening hole 23 is a through hole. The sizes (diameters) of the plurality of fastening holes 23 are equal to each other. When viewed in the rotation axis direction, the fastening hole 23 has a perfect round shape. The bolt 200 is an example of a "fastener." [0016] When viewed in the rotation axis direction, the plurality of fastening holes 23 are provided equiangularly in the stator core 20. Specifically, eight fastening holes 23 are provided, and the eight fastening holes 23 are arranged at angular intervals of 45°. The "angular interval of 45°" means that line segments passing through the centers of the fastening holes 23 along the radial direction intersect each other at 45°.

The rotating electrical machine 100 includes the concentric winding coils 30 formed of flat rectangular conductor wires (specifically, by concentric winding). The concentric winding coils 30 are arranged in the slots 21 of the stator core 20. The concentric winding coil 30 is an example of a "coil." The flat rectangular conductor wire is an example of a "conductor wire." [0018] As illustrated in FIG. 4, the concentric winding coil 30 is a coil formed such that a first slot-housed portion 30a to be housed in a predetermined slot 21 and a second slot-housed portion 30b to be housed in a slot 21 different from the predetermined slot 21 are continuously wound via a first coil end portion 30c on one side in the rotation axis direction and a second coil end portion 30d on the other side in the rotation axis direction. Specifically, the concentric winding coil 30 is a coil formed such that the first slot-housed portion 30a, the first coil end portion 30c, the second slot-housed portion 30b, and the second coil end portion 30d are continuously wound by a single conductor wire.

Figure 2:
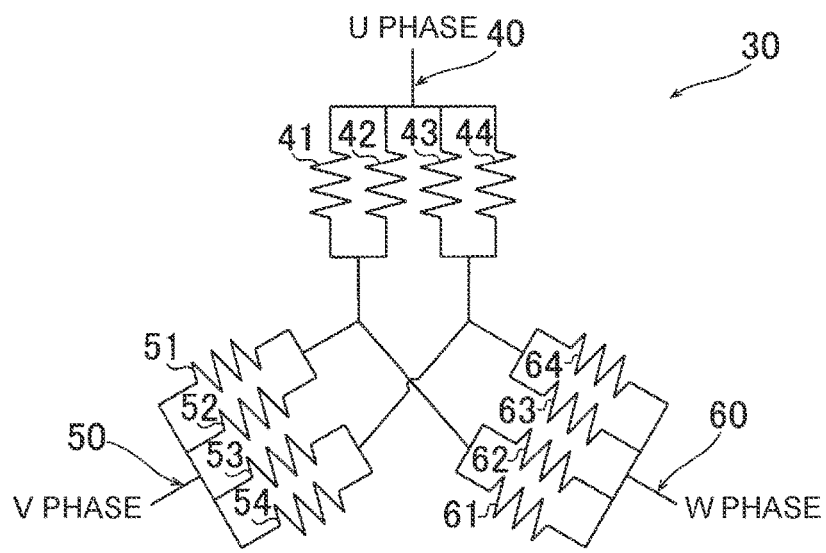
FIG. 2 is a circuit diagram of three-phase concentric winding coils connected by star connection according to the embodiment of the present disclosure.

As illustrated in FIG. 2, the concentric winding coils 30 include U-phase concentric winding coils 40, V-phase concentric winding coils 50, and W-phase concentric winding coils 60. The U-phase concentric winding coils 40 include first concentric winding coils 41, second concentric winding coils 42, third concentric winding coils 43, and fourth concentric winding coils 44 of the U phase that are connected in parallel. The V-phase concentric winding coils 50 include first concentric winding coils 51, second concentric winding coils 52, third concentric winding coils 53, and fourth concentric winding coils 54 of the V phase that are connected in parallel. The W-phase concentric winding coils 60 include first concentric winding coils 61, second concentric winding coils 62, third concentric winding coils 63, and fourth concentric winding coils 64 of the W phase that are connected in parallel. The U-phase concentric winding coils 40, the V-phase concentric winding coils 50, and the W-phase concentric winding coils 60 are connected by star connection.

The first concentric winding coils 41 and the second concentric winding coils 42 are arranged in adjacent slots 21 (see FIG. 5). The third concentric winding coils 43 and the fourth concentric winding coils 44 are arranged in adjacent slots 21.

The U-phase concentric winding coils 40, the V-phase concentric winding coils 50, and the W-phase concentric winding coils 60 are arranged in the slots 21 with similar structures. Therefore, the U-phase concentric winding coils 40 are described below.

(Structure of U-Phase Concentric Winding Coils)

<Structure of First Concentric Winding Coils>

The first concentric winding coils 41 (coils indicated by continuous lines in FIG. 3 and FIG. 4) are described with reference to FIG. 3 and FIG. 4. FIG. 4 illustrates only the first concentric winding coils 41 of the U phase out of the U-phase concentric winding coils 40. FIG. 4A illustrates the slots 21 and the first concentric winding coils 41 arranged in the slots 21. FIG. 4B illustrates the centers of magnetic poles 70 (long dashed double-short dashed lines) and the positions of coil centers (C11, C12) and connection centers (C2, C3) relative to the centers (A1, A2, A3) of the magnetic poles 70. FIG. 4C illustrates the first concentric winding coils 41 arranged in the slots 21 and formed of flat rectangular conductor wires. FIG. 4C also illustrates a positional relationship of the permanent magnets 11 to the slots 21. The numbers of the slots 21 in FIG. 4C are slot numbers.

As illustrated in FIG. 4, the coil center (C11, C12) refers to a line segment passing along the rotation axis direction through the circumferential centers of the first slot-housed portion 30a housed in a predetermined slot 21 and the second slot-housed portion 30b housed in a slot 21 different from the predetermined slot 21 in the concentric winding coil 30. The concentric winding coil 30 has a substantially hexagonal shape, and therefore bending portions of the first coil end portion 30c and the second coil end portion 30d are the coil centers. The present disclosure is not limited to this case. Originally, the coil center refers to a line segment passing along the rotation axis direction through the circumferential centers of the first slot-housed portion 30a housed in a predetermined slot 21 and the second slot-housed portion 30b housed in a slot 21 different from the predetermined slot 21.

As illustrated in FIG. 4, the first concentric winding coils 41 include one-side concentric winding coils 41a each having the coil center C11 located on one side in the circumferential direction (X1 direction side) with respect to the center A1 of a first magnetic pole 71, and other-side concentric winding coils 41b each having the same phase (U phase) as the phase of the one-side concentric winding coil 41a and located on the other side in the circumferential direction (X2 direction side) with respect to the center A3 of a third magnetic pole 73.

First connecting portions 41c each connecting the one-side concentric winding coil 41a and the other-side concentric winding coil 41b are provided. The first connecting portion 41c is arranged so as to bridge a slot 21 having a slot number 18 and a slot 21 having a slot number 13. That is, the pitch of the slots 21 in which the first connecting portion 41c is arranged is 5. The first concentric winding coils 41 include second connecting portions 41d each connecting the other-side concentric winding coil 41b of one group 41e out of adjacent groups 41e and the one-side concentric winding coil 41a of the other group 41e. The second connecting portion 41d has a length different from the length of the first connecting portion 41c. Specifically, the second connecting portion 41d is arranged so as to bridge a slot 21 having a slot number 31 and a slot 21 having a slot number 24. That is, the pitch of the slots 21 in which the second connecting portion 41d is arranged is 7.

The first concentric winding coils 41 are structured such that the one-side concentric winding coil 41a, the first connecting portion 41c, the other-side concentric winding coil 41b, and the second connecting portion 41d are arranged in this order in the entire area over the first concentric winding coils 41.

<Structures of Second to Fourth Concentric Winding Coils>

The second concentric winding coils 42, the third concentric winding coils 43, and the fourth concentric winding coils 44 have structures similar to that of the first concentric winding coils 41. That is, as illustrated in FIG. 5, the second concentric winding coils 42 (coils indicated by dashed lines in FIG. 5) include one-side concentric winding coils 42a, other-side concentric winding coils 42b, first connecting portions 42c, and second connecting portions 42d. The third concentric winding coils 43 (coils indicated by long dashed short dashed lines in FIG. 5) include one-side concentric winding coils 43a, other-side concentric winding coils 43b, first connecting portions 43c, and second connecting portions 43d. The fourth concentric winding coils 44 (coils indicated by dotted lines in FIG. 5) include one-side concentric winding coils 44a, other-side concentric winding coils 44b, first connecting portions 44c, and second connecting portions 44d.

(Structures of V-Phase and W-Phase Concentric Winding Coils)

The V-phase concentric winding coils 50 and the W-phase concentric winding coils 60 have structures similar to that of the U-phase concentric winding coils 40.

(Specific Structures of Concentric Winding Coils)

Next, specific structures of the concentric winding coils 30 are described with reference to FIG. 6 and FIG. 7. The one-side concentric winding coil 41a and the other-side concentric winding coil 41b of the first concentric winding coils 41 of the U-phase concentric winding coils 40 are described below. The second concentric winding coils 42, the third concentric winding coils 43, and the fourth concentric winding coils 44 have structures similar to that of the first concentric winding coils 41. The structures of the V-phase concentric winding coils 50 and the W-phase concentric winding coils 60 are similar to the structure of the U-phase concentric winding coils 40.

Figure 6A:
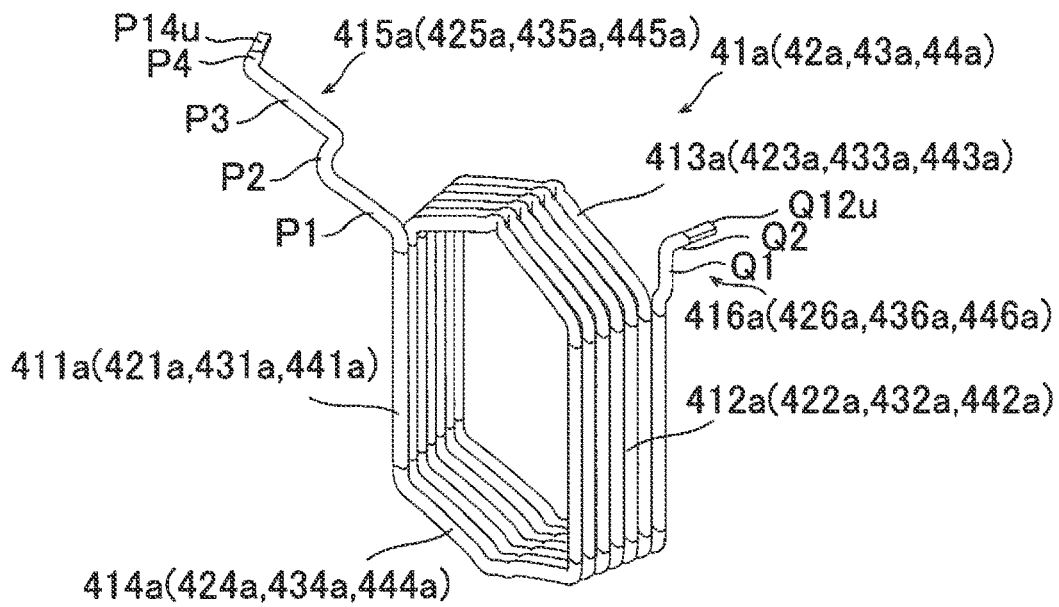
FIG. 6A is a perspective view.
Figure 6B:
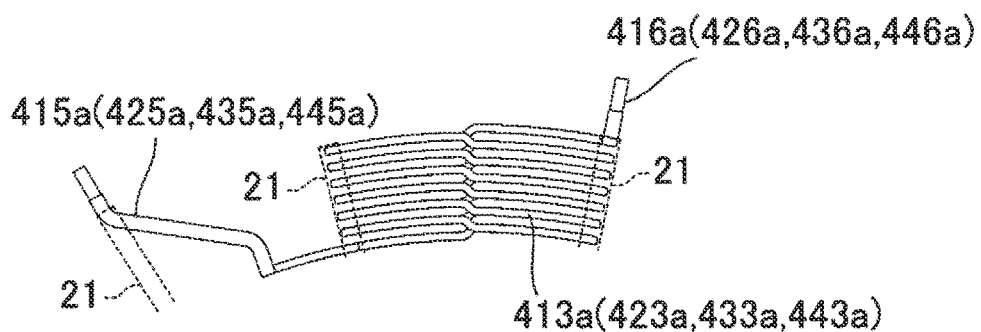
FIG. 6B is a top view.
Figure 6C:
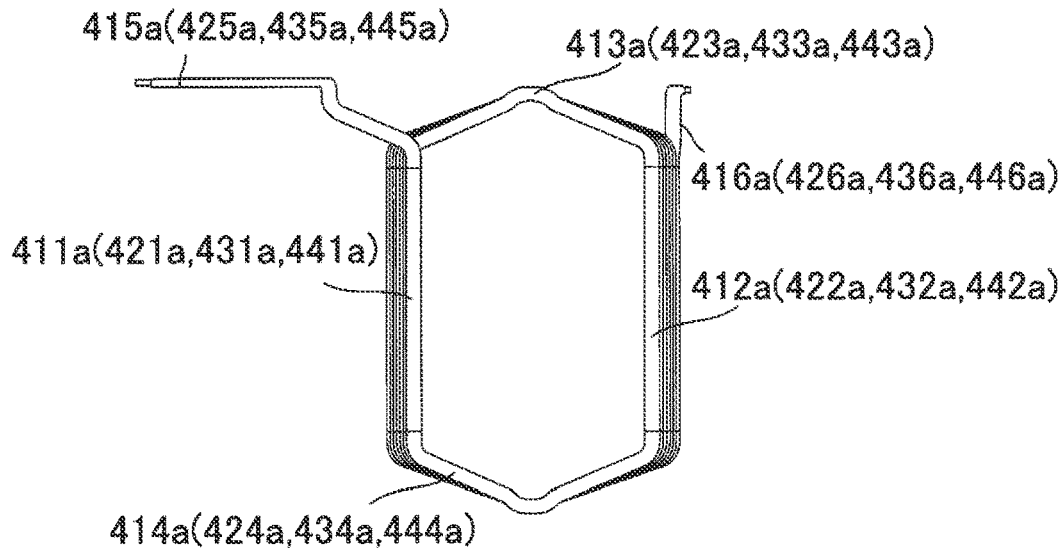
FIG. 6C is a side view of a one-side concentric winding coil.
Figure 7A:
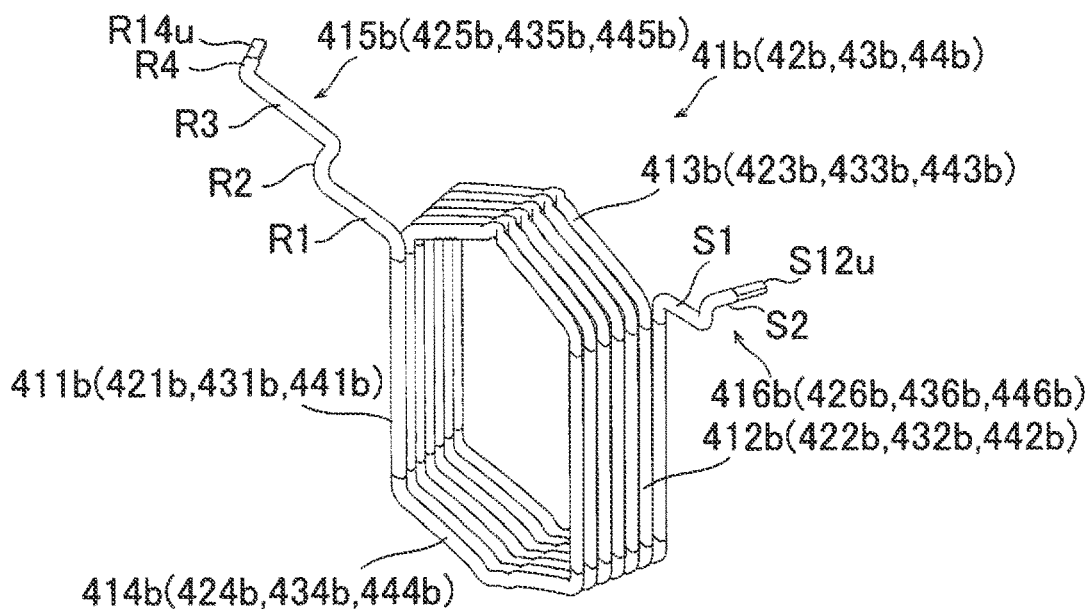
FIG. 7A is a perspective view.
Figure 7B:
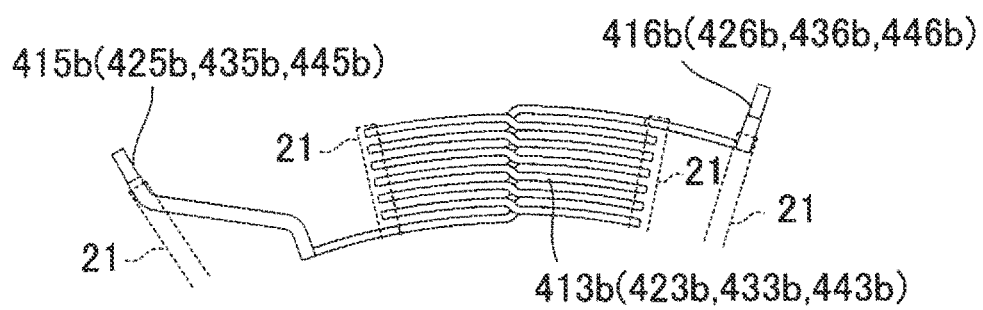
FIG. 7B is a top view.
Figure 7C:
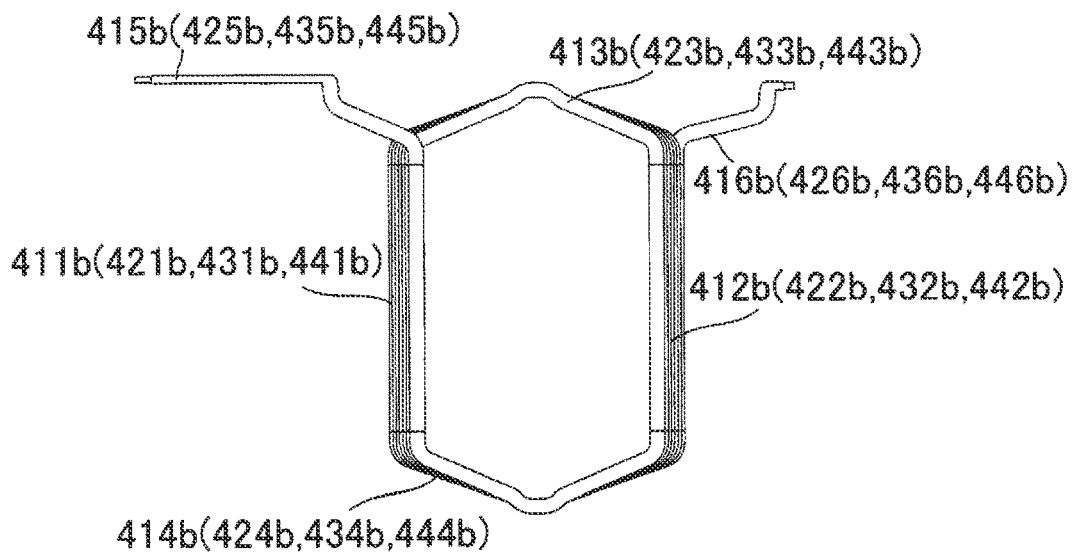
FIG. 7C is a side view of an other-side concentric winding coil.

As illustrated in FIG. 6 and FIG. 7, the first concentric winding coils 41 include two types of concentric winding coil that are the one-side concentric winding coil 41a and the other-side concentric winding coil 41b.

As illustrated in FIG. 6, the one-side concentric winding coil 41a includes a pair of slot-housed portions 411a and 412a to be housed in the slots 21 of the stator core 20, and coil end portions 413a and 414a connecting the pair of slot-housed portions 411a and 412a to each other. The one-side concentric winding coil 41a further includes a radially inner lead wire portion 415a that is one end of the concentrically wound flat rectangular conductor wire and is arranged so as to extend from the radially inner side to the radially outer side of the stator core 20, and a radially outer lead wire portion 416a that is the other end of the concentrically wound flat rectangular conductor wire and is arranged on the radially outer side of the stator core 20. The radially inner lead wire portion 415a is an example of a "lead wire portion" or "lead wire."

The radially inner lead wire portion 415a includes a portion P1 connected to the slot-housed portion 411a, a portion P2 bent radially outward from the portion P1, a portion P3 bent in the circumferential direction from the portion P2, and a portion P4 bent radially outward from the portion P3. As illustrated in FIG. 6B, when viewed in the rotation axis direction, the portion P4 of the radially inner lead wire portion 415a is arranged on a radial extension line of a slot 21 located away in the circumferential direction at a distance corresponding to five slots from the slot 21 in which the slot-housed portion 411a is arranged.

The radially outer lead wire portion 416a includes a portion Q1 connected to the slot-housed portion 412a, and a portion Q2 bent radially outward from the portion Q1. As illustrated in FIG. 6B, when viewed in the rotation axis direction, the radially outer lead wire portion 416a is arranged on a radial extension line of the same slot 21 as that of the slot-housed portion 412a of the one-side concentric winding coil 41a. Specifically, when viewed in the rotation axis direction, the portion Q2 of the radially outer lead wire portion 416a is formed so as to extend radially outward on the radial extension line of the slot 21 in which the slot-housed portion 412a is arranged.

As illustrated in FIG. 7, the other-side concentric winding coil 41b includes a pair of slot-housed portions 411b and 412b to be housed in the slots 21 of the stator core 20, and coil end portions 413b and 414b connecting the pair of slot-housed portions 411b and 412b to each other. The other-side concentric winding coil 41b further includes a radially inner lead wire portion 415b that is one end of the concentrically wound flat rectangular conductor wire and is arranged so as to extend from the radially inner side to the radially outer side of the stator core 20, and a radially outer lead wire portion 416b that is the other end of the concentrically wound flat rectangular conductor wire and is arranged on the radially outer side of the stator core 20. The radially inner lead wire portion 416b is an example of the "lead wire portion."

The radially inner lead wire portion 415b has a structure similar to that of the radially inner lead wire portion 415a (see FIG. 7). That is, the radially inner lead wire portion 415b includes a portion R1 connected to the slot-housed portion 411b, a portion R2 bent radially outward from the portion R1, a portion R3 bent in the circumferential direction from the portion R2, and a portion R4 bent radially outward from the portion R3.

The radially outer lead wire portion 416b includes a portion S1 connected to the slot-housed portion 412b, and a portion S2 bent radially outward from the portion S1. As illustrated in FIG. 7B, when viewed in the rotation axis direction, the radially outer lead wire portion 416b is arranged on a radial extension line of a slot 21 located away in the circumferential direction of the stator core 20 at a distance corresponding to a predetermined number of slots from the slot 21 in which the slot-housed portion 412b of the radially outer lead wire portion 416b is housed. Specifically, when viewed in the rotation axis direction, the portion S2 of the radially outer lead wire portion 416b is formed so as to extend radially outward on a radial extension line of a slot 21 located away at a distance corresponding to two slots from the slot 21 in which the slot-housed portion 412b of the radially outer lead wire portion 416b is housed. That is, the radially outer lead wire portion 416b of the other-side concentric winding coil 41b is structured to be longer than the radially outer lead wire portion 416a of the one-side concentric winding coil 41a.

In the first concentric winding coils 41, the first connecting portion 41c (see FIG. 4) is structured by the radially outer lead wire portion 416a of the one-side concentric winding coil 41a and the radially inner lead wire portion 415b of the other-side concentric winding coil 41b. The second connecting portion 41d is structured by the radially inner lead wire portion 415a of the one-side concentric winding coil 41a and the radially outer lead wire portion 416b of the other-side concentric winding coil 41b.

The one-side concentric winding coil 42a and the other-side concentric winding coil 42b of the second concentric winding coils 42 (the one-side concentric winding coil 43a and the other-side concentric winding coil 43b of the third concentric winding coils 43 and the one-side concentric winding coil 44a and the other-side concentric winding coil 44b of the fourth concentric winding coils 44) have structures similar to those of the one-side concentric winding coil 41a and the other-side concentric winding coil 41b of the first concentric winding coils 41, respectively.

That is, the one-side concentric winding coil 42a of the second concentric winding coils 42 includes slot-housed portions 421a and 422a, coil end portions 423a and 424a, a radially inner lead wire portion 425a, and a radially outer lead wire portion 426a. The other-side concentric winding coil 42b includes slot-housed portions 421b and 422b, coil end portions 423b and 424b, a radially inner lead wire portion 425b, and a radially outer lead wire portion 426b. The radially inner lead wire portion 425b is an example of the "lead wire portion" or "lead wire." The radially outer lead wire portion 426a is also an example of the "lead wire portion" or "lead wire."

The one-side concentric winding coil 43a of the third concentric winding coils 43 includes slot-housed portions 431a and 432a, coil end portions 433a and 434a, a radially inner lead wire portion 435a, and a radially outer lead wire portion 436a. The other-side concentric winding coil 43b includes slot-housed portions 431b and 432b, coil end portions 433b and 434b, a radially inner lead wire portion 435b, and a radially outer lead wire portion 436b.

The one-side concentric winding coil 44a of the fourth concentric winding coils 44 includes slot-housed portions 441a and 442a, coil end portions 443a and 444a, a radially inner lead wire portion 445a, and a radially outer lead wire portion 446a. The other-side concentric winding coil 44b includes slot-housed portions 441b and 442b, coil end portions 443b and 444b, a radially inner lead wire portion 445b, and a radially outer lead wire portion 446b.

(Structure of Plurality of Concentric Winding Coils Arranged in Slots of Stator Core)

Next, the structure of the plurality of concentric winding coils 30 arranged in the slots 21 of the stator core 20 is described with reference to FIG. 8 to FIG. 12.

Figure 8:
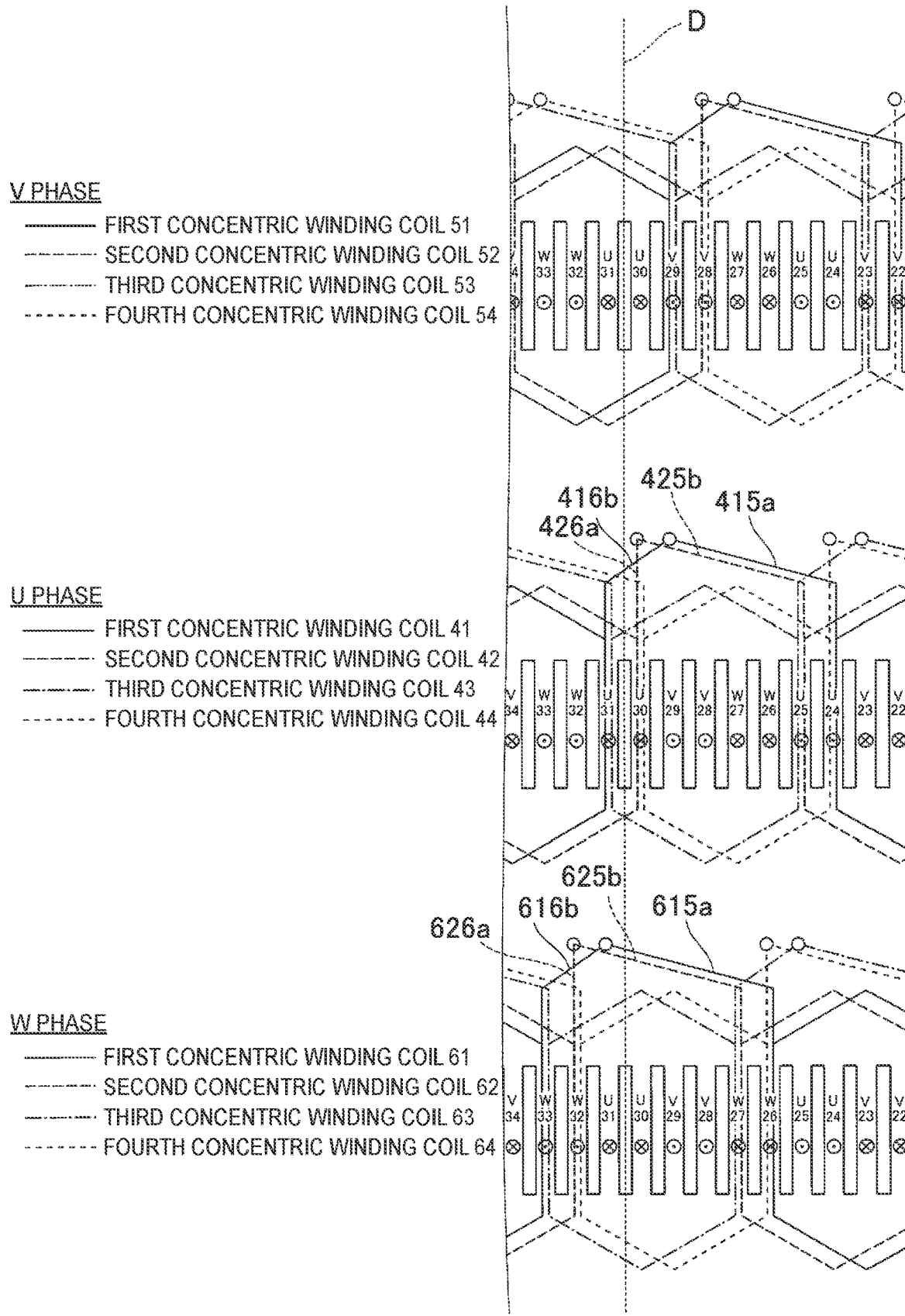
FIG. 8 is a diagram illustrating a state in which U-phase, V-phase, and W-phase concentric winding coils are arranged in the slots.

Regarding the U phase, a one-side concentric winding coil 41a arranged in the slot 21 having the number 24, an other-side concentric winding coil 41b arranged in the slot 21 having the number 31, an other-side concentric winding coil 42b arranged in a slot 21 having a number 25, and a one-side concentric winding coil 42a arranged in a slot 21 having a number 30 are described below as illustrated in FIG. 8. Regarding the W phase, a one-side concentric winding coil 61a arranged in a slot 21 having a number 26, an other-side concentric winding coil 61b arranged in a slot 21 having a number 33, an other-side concentric winding coil 62b arranged in a slot 21 having a number 27, and a one-side concentric winding coil 62a arranged in a slot 21 having a number 32 are described. A dotted line D in FIG. 8 indicates the central position of the fastening hole 23. Eight fastening holes 23 are provided, and arrangement conditions of the U-phase concentric winding coils 40, the V-phase concentric winding coils 50, and the W-phase concentric winding coils 60 relative to the eight fastening holes 23 are similar to arrangement conditions illustrated in FIG. 8, respectively.

Figure 9:
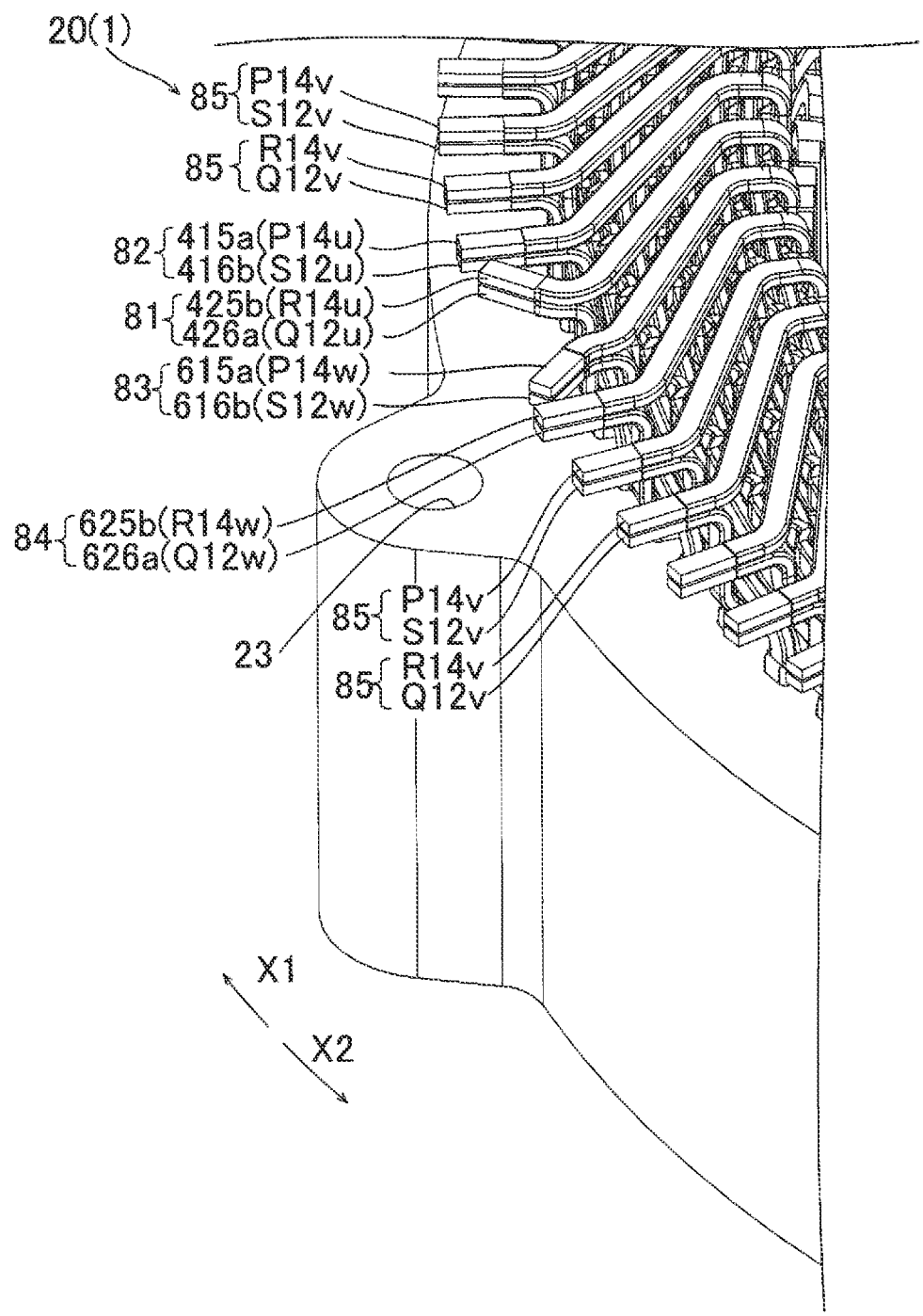
FIG. 9 is a perspective view (1) of connecting portions in the vicinity of a fastening hole.

In this embodiment, as illustrated in FIG. 9 (and FIG. 1), a connecting portion 81, which is a portion where the radially inner lead wire portion 425b (portion R14u) of the other-side concentric winding coil 42b and the radially outer lead wire portion 426a (portion Q12u) of the one-side concentric winding coil 42a of the U phase are connected to each other, is arranged so as not to overlap the fastening hole 23 when viewed in the rotation axis direction. Specifically, the connecting portion 81 is arranged so as not to overlap the fastening hole 23 when viewed in the rotation axis direction in a state in which a distance W1 (see FIG. 10) between the connecting portion 81 adjacent to the fastening hole 23 in the circumferential direction of the stator core 20 when viewed in the rotation axis direction and a connecting portion 82 adjacent to the connecting portion 81 on a side opposite to the fastening hole 23 side out of a plurality of connecting portions 81 to 85 that are portions where the lead wire portions of the plurality of concentric winding coils 30 are connected to each other is smaller than a distance W2 (see FIG. 10) between connecting portions other than the connecting portion 81 adjacent to the fastening hole 23 (for example, the connecting portions 82 and 85).

The phase of the connecting portion 81 (U phase) arranged so as not to overlap the fastening hole 23 is identical to the phase of the connecting portion 82 (connecting portion where a portion P14u and a portion S12u are connected to each other) adjacent to the connecting portion 81 on the side opposite to the fastening hole 23 side in the circumferential direction of the stator core 20. The word "adjacent" refers to a state in which two connecting portions are arranged at a predetermined distance in the circumferential direction and no other connecting portion is present between the two adjacent connecting portions. The connecting portion 81 is an example of a "first connecting portion" or "first connector."

The connecting portion 83 where a radially inner lead wire portion 615a (portion P14w) of the one-side concentric winding coil 61a and a radially outer lead wire portion 616b (portion S12w) of the other-side concentric winding coil 61b of the W phase are connected to each other is arranged so as not to overlap the fastening hole 23 when viewed in the rotation axis direction. Specifically, the connecting portion 83 is arranged so as not to overlap the fastening hole 23 when viewed in the rotation axis direction in a state in which a distance W3 (see FIG. 10) between the connecting portion 83 adjacent to the fastening hole 23 in the circumferential direction of the stator core 20 when viewed in the rotation axis direction and the connecting portion 84 adjacent to the connecting portion 83 on a side opposite to the fastening hole 23 side is smaller than a distance W4 (see FIG. 10) between connecting portions other than the connecting portion 83 adjacent to the fastening hole 23 (for example, the connecting portions 84 and 85).

The phase of the connecting portion 83 (W phase) arranged so as not to overlap the fastening hole 23 is identical to the phase of the connecting portion 84 (connecting portion where a portion R14w and a portion Q12w are connected to each other) adjacent to the connecting portion 83 on the side opposite to the fastening hole 23 side in the circumferential direction of the stator core 20. Radially inner lead wire portions 615a and 625b and radially outer lead wire portions 616 and 626a are examples of the "lead wire portion" or "lead wire." The connecting portion 83 is an example of a "second connecting portion" or "second connector."

Specifically, the fastening hole 23 is structured such that the bolt 200 (see FIG. 1) is inserted into the fastening hole 23. In the bolt 200, the diameter of a head arranged outside the fastening hole 23 is larger than the diameter of a portion inserted into the fastening hole 23. The connecting portion 81 (connecting portion 83) is arranged so as not to overlap the bolt 200 in a state in which the bolt 200 is inserted into the fastening hole 23. That is, the connecting portion 81 (connecting portion 83) is arranged away from the outer edge of the fastening hole 23 so as not to interfere with the bolt 200 inserted into the fastening hole 23.

The connecting portions 85 (portions P14v, Q12v, R14v, and S12v) of the V-phase concentric winding coils 50 are not arranged in the vicinity of the fastening hole 23.

In this embodiment, the connecting portion 81 (connecting portion 83) is arranged in a state in which its position is shifted in the circumferential direction of the stator core 20 so as not to overlap the fastening hole 23. That is, when viewed in the rotation axis direction, the connecting portion 81 (connecting portion 83) is arranged so as to intersect the radial direction unlike the connecting portion 82 (connecting portion 84) arranged along the radial direction.

In this embodiment, the connecting portion 81 is arranged on one side of the fastening hole 23 in the circumferential direction of the stator core 20 (X1 direction side) so as to be closer to the adjacent connecting portion 82 of the same phase when viewed in the rotation axis direction. The connecting portion 83 is arranged on the other side of the fastening hole 23 in the circumferential direction of the stator core 20 (X2 direction side) so as to be closer to the adjacent connecting portion 84 of the same phase when viewed in the rotation axis direction. Specifically, the connecting portion 81 (connecting portion 83) is arranged so that the distance (distance in the circumferential direction) between the connecting portion 81 (connecting portion 83) and the connecting portion 82 (connecting portion 84) gradually decreases from the radially inner side to the radially outer side. When viewed in the rotation axis direction, the radially outer end of the connecting portion 81 (connecting portion 83) is arranged on the radially inner side (in a receding state) with respect to the radially outer end of the connecting portion 82 (connecting portion 84).

In this embodiment, the phase of the connecting portion 81 (U phase) and the phase of the connecting portion 83 (W phase) are different from each other. That is, the two connecting portions 81 and 82 of the U phase are arranged in this order along the circumferential direction (X2 direction). The fastening hole 23 is interposed and the two connecting portions 83 and 84 of the W phase are arranged in this order along the circumferential direction (X2 direction). The connecting portion 85 of the V phase is arranged on the X1 direction side of the connecting portion 82. The connecting portion 85 of the V phase is also arranged on the X2 direction side of the connecting portion 84.

In this embodiment, the connecting portion 81 is arranged so as not to overlap the fastening hole 23 when viewed in the rotation axis direction by varying bending conditions of the radially inner lead wire portions 415a and 425b (radially outer lead wire portions 416b and 426a) of the same phase (U phase) that are adjacent to each other in the circumferential direction. Similarly, the connecting portion 83 is arranged so as not to overlap the fastening hole 23 when viewed in the rotation axis direction by varying bending conditions of the radially inner lead wire portions 615a and 625b (radially outer lead wire portions 616b and 626a) of the same phase (W phase) that are adjacent to each other in the circumferential direction. The "bending condition" refers to a bending angle and a bending direction of the lead wire portion (radially outer lead wire portion or radially inner lead wire portion). That is, the phrase "varying the bending conditions" means that the bending angle and the bending direction are varied. The "bending" is a broad concept encompassing a gently bent (curved) state.

Specifically, in this embodiment, the radially inner lead wire portion 415a (radially outer lead wire portion 416b) included in the connecting portion 82 of the same phase (U phase) that is adjacent to the connecting portion 81 on one side in the circumferential direction is bent in a direction along the radial direction (to one side in the circumferential direction). The radially inner lead wire portion 425b (radially outer lead wire portion 426a) included in the connecting portion 81 is bent to one side in the circumferential direction so as to intersect the radial direction. That is, both the radially inner lead wire portion 415a (radially outer lead wire portion 416b) and the radially inner lead wire portion 425b (radially outer lead wire portion 426a) are bent to one side in the circumferential direction, but the degrees of bending (angles) are different from each other.

In this embodiment, the radially inner lead wire portion 625b (radially outer lead wire portion 626a) included in the connecting portion 84 of the same phase (W phase) that is adjacent to the connecting portion 83 on the other side in the circumferential direction is bent in a direction along the radial direction (to one side in the circumferential direction). The radially inner lead wire portion 615a (radially outer lead wire portion 616b) included in the connecting portion 83 is bent to the other side in the circumferential direction so as to intersect the radial direction. That is, the radially inner lead wire portion 625b (radially outer lead wire portion 626a) and the radially inner lead wire portion 615a (radially outer lead wire portion 616b) are bent in different directions in the circumferential direction.

Figure 10:
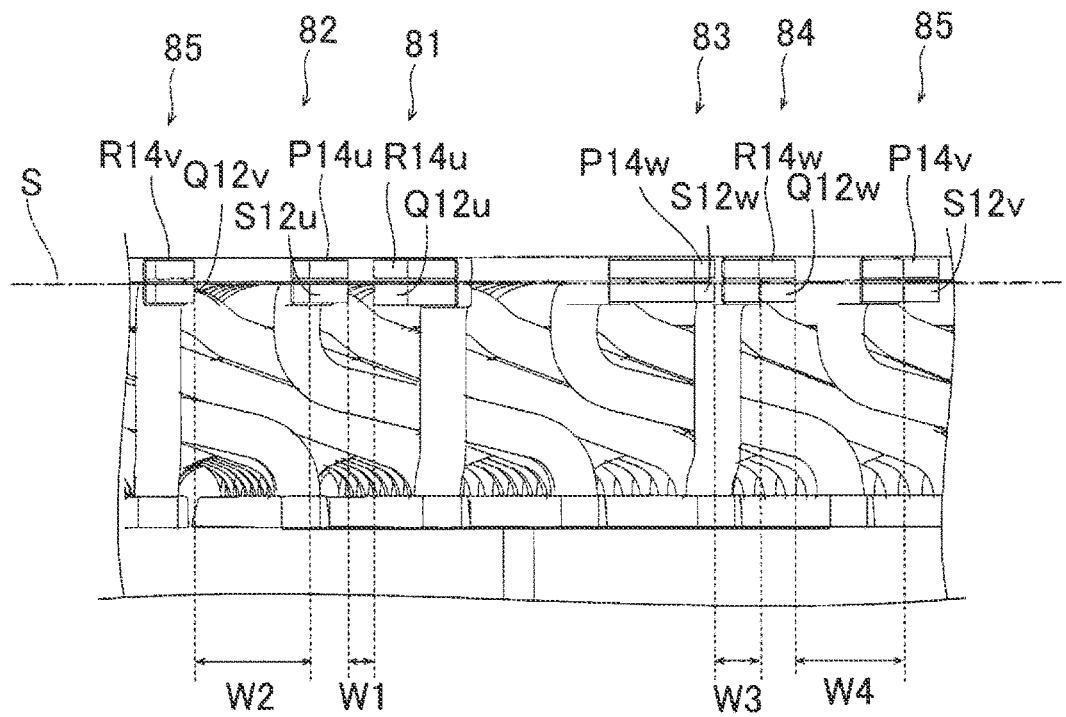
FIG. 10 is a side view of the connecting portions in the vicinity of the fastening hole.

In this embodiment, as illustrated in FIG. 10, the connecting portion 81 is arranged so as not to overlap the fastening hole 23 when viewed in the rotation axis direction by bending the radially inner lead wire portion 425b (radially outer lead wire portion 426a) along a plane orthogonal to the rotation axis direction (plane S). Similarly, the connecting portion 83 is arranged so as not to overlap the fastening hole 23 when viewed in the rotation axis direction by bending the radially inner lead wire portion 615a (radially outer lead wire portion 616b) along the plane orthogonal to the rotation axis direction. In other words, the "plane orthogonal to the rotation axis direction" is a plane along the radial direction. The radially inner lead wire portion 425b (radially outer lead wire portion 426a) and the radially inner lead wire portion 615a (radially outer lead wire portion 616b) may be bent after the concentric winding coils 30 (40, 60) are arranged in the slots 21, or the concentric winding coils 30 (40, 60) bent in advance may be arranged in the slots 21.

In this embodiment, as illustrated in FIG. 1, the number of the plurality of fastening holes 23 is a divisor of a number obtained by dividing the number of the plurality of connecting portions by 2. The number of the plurality of connecting portions is 96. That is, the number of the plurality of connecting portions is 96 that is equal to the number of slots 21 (number of concentric winding coils 30). The number (8) of the plurality of fastening holes 23 is a divisor of 48 (2, 3, 6, 8, 12, 16, 24, 48) that is a value obtained by dividing 96 by 2. Thus, the center of each of the eight fastening holes 23 arranged equiangularly can be arranged between two adjacent connecting portions when viewed in the rotation axis direction. As a result, the connecting portion 81 (connecting portion 83) is arranged so as not to overlap the fastening hole 23 when viewed in the rotation axis direction by moving (bending) the connecting portion arranged on one side of the fastening hole 23 and the connecting portion arranged on the other side of the fastening hole 23 to one side and to the other side, respectively.

The connecting portions of the radially inner lead wire portions and the connecting portions of the radially outer lead wire portions of the U phase (W phase) that are arranged at parts other than the vicinity of the fastening holes 23 are arranged along the radial direction similarly to the connecting portions of the V phase. In the above, description is given of the structures of the portions where the radially inner lead wire portion and the radially outer lead wire portion are connected (welded) to each other. Description is given below of structures of portions where the radially inner lead wire portion and the radially outer lead wire portion are not connected to each other.

Figure 11:
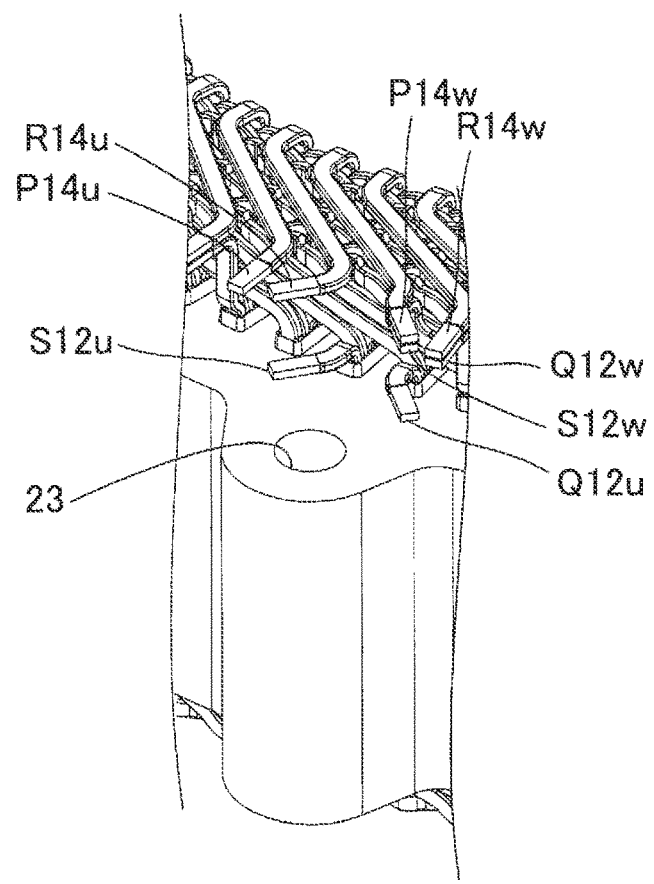
FIG. 11 is a perspective view (2) of the connecting portions in the vicinity of the fastening hole.

As illustrated in FIG. 11, when the connecting portion of the U phase is connected to an unillustrated power line (neutral line), the portions P14u and S12u (portions R14u and Q12u) are not connected to each other. In this case, the portions P14u and S12u (portions R14u and Q12u) are arranged away from each other in the rotation axis direction. The portion Q12u is arranged closer to the portions P14w, R14w, Q12w, and S12w of the W phase (on the other side of the fastening hole 23 in the circumferential direction), but the portions P14w, R14w, Q12w, and S12w of the W phase are arranged above the portion Q12u while keeping a distance, and therefore the portion Q12u and the portions P14w, R14w, Q12w, and S12w of the W phase are insulated from each other.

Figure 12:
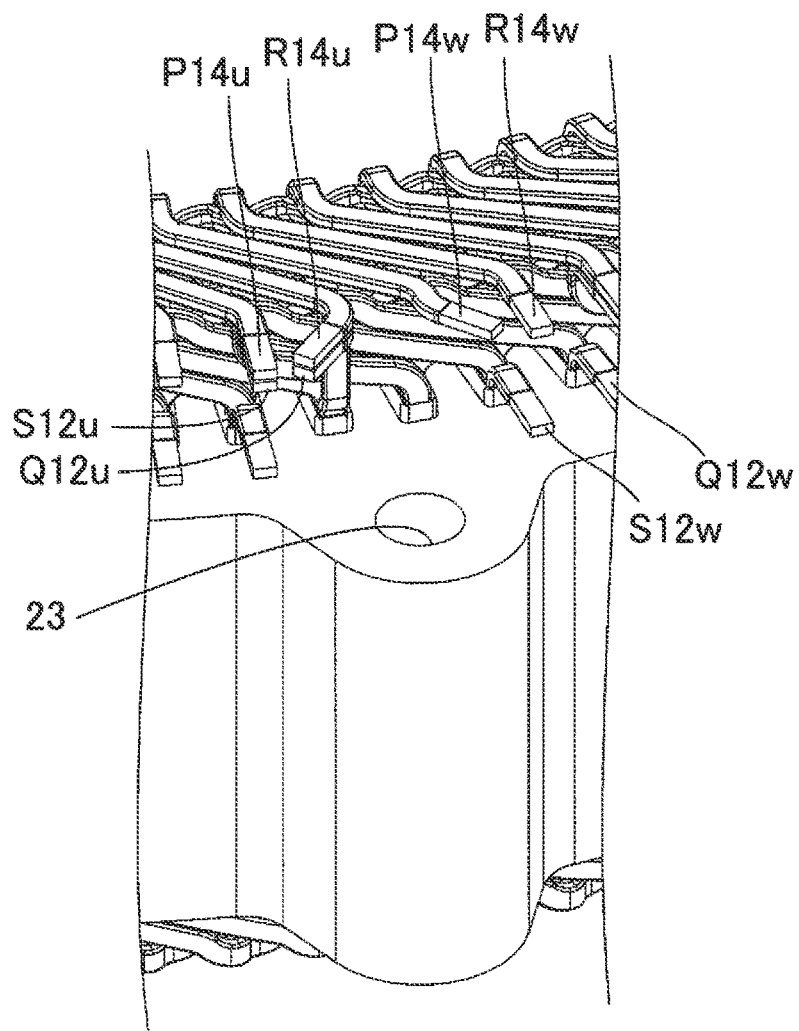
FIG. 12 is a perspective view (3) of the connecting portions in the vicinity of the fastening hole.

As illustrated in FIG. 12, when the connecting portion of the W phase is connected to an unillustrated power line (neutral line), P14w and S12w (portions R14w and Q12w) are not connected to each other. In this case, the portions P14w and S12w (portions R14w and Q12w) are arranged away from each other in the rotation axis direction.

Effects of Embodiment

In this embodiment, as described above, the connecting portion (81, 83) is arranged so as not to overlap the fastening hole (23) in the state in which the distance (W1, W3) between the connecting portion (81, 83) adjacent to the fastening hole (23) in the circumferential direction of the stator core (20) when viewed in the rotation axis direction and the connecting portion (82, 84) adjacent to the connecting portion (81, 83) on the side opposite to the fastening hole (23) side out of the plurality of connecting portions (81 to 85) is smaller than the distance (W2, W4) between the connecting portions (82, 84, 85) other than the connecting portion (81, 83) adjacent to the fastening hole (23). Therefore, the fastening hole (23) can be arranged between the connecting portions (81, 83) in the circumferential direction of the stator core (20) when viewed in the rotation axis direction. Thus, the diameter of a portion of the stator core (20) other than the fastening hole (23) (portion that structures the slots (21) and a yoke) can be increased as compared to a case where the fastening hole (23) is arranged on the radially outer side with respect to the connecting portions (81, 83). As a result, a decrease in power of the rotating electrical machine (100) can be prevented while keeping the size of the stator core (20) within a predetermined size range. Since the connecting portion (81) is arranged so as not to overlap the fastening hole (23) when viewed in the rotation axis direction, the connecting portion (81) is prevented from interfering with the fastener (200) inserted into the fastening hole (23) and a jig for attaching the fastener (200). As a result, a decrease in insulation performance between adjacent connecting portions can be prevented while facilitating attachment of the stator core (20). The above description of the effects is directed to the U phase, but similar effects are attained in the case of the W phase.

In this embodiment, as described above, the phase of the connecting portion (81) arranged so as not to overlap the fastening hole (23) is identical to the phase of the connecting portion (82) adjacent to the connecting portion (81) on the side opposite to the fastening hole (23) side in the circumferential direction of the stator core (20). Therefore, the potentials of the connecting portion (81) arranged so as not to overlap the fastening hole (23) and the adjacent connecting portion (82) are equal to each other. Thus, the decrease in the insulation performance between the adjacent connecting portions can be prevented.

In this embodiment, as described above, the connecting portions include the connecting portion (81) arranged on one side of the fastening hole (23) in the circumferential direction of the stator core (20) so as to be closer to the adjacent connecting portion (82) of the same phase when viewed in the rotation axis direction, and the connecting portion (83) arranged on the other side of the fastening hole (23) in the circumferential direction of the stator core (20) so as to be closer to the adjacent connecting portion (84) of the same phase when viewed in the rotation axis direction. Thus, the movement amount (bending angle) of each of the connecting portion (81) and the connecting portion (83) can be reduced unlike a case where only the connecting portion (81) or the connecting portion (83) is moved (shifted) so as not to overlap the fastening hole (23).

In this embodiment, as described above, the phase of the connecting portion (81) and the phase of the connecting portion (83) are different from each other. Therefore, the connecting portion (81) and the connecting portion (83) are arranged away from each other. Thus, the insulation performance between the connecting portion (81) and the connecting portion (83) can be improved.

In this embodiment, as described above, the plurality of fastening holes (23) are provided equiangularly in the stator core (20) when viewed in the rotation axis direction, and the number of the plurality of fastening holes (23) is the divisor of the number obtained by dividing the number of the plurality of connecting portions by 2. Therefore, the fastening hole (23) can be arranged between the connecting portion (81) and the connecting portion (83) that are adjacent to each other when viewed in the rotation axis direction. Thus, the connecting portion (81) and the connecting portion (83) can easily be moved (bent) so as not to overlap the fastening hole (23).

In this embodiment, as described above, the connecting portion (81) is arranged so as not to overlap the fastening hole (23) when viewed in the rotation axis direction by varying the bending conditions of the lead wire portions (415*a*, 416*b*, 425*b*, 426*a*) of the same phase that are adjacent to each other in the circumferential direction. Thus, the decrease in the insulation performance can easily be prevented by bending the lead wire portions (415*a*, 416*b*, 425*b*, 426*a*) so that the connecting portion (81) and the connecting portion (82) of the same phase that is adjacent to the connecting portion (81) in the circumferential direction are closer to each other. The above description of the effect is directed to the U phase, but a similar effect is attained in the case of the W phase.

In this embodiment, as described above, the lead wire portion (415*a*, 416*b*) included in the connecting portion (82) of the same phase that is adjacent to the connecting portion (81) on one side in the circumferential direction is bent in the direction along the radial direction, and the lead wire portion (425*b*, 426*a*) included in the connecting portion (81) is bent to one side in the circumferential direction so as to intersect the radial direction. Therefore, the connecting portion (81) is closer to the connecting portion (82) of the same phase that is adjacent to the connecting portion (81) on one side in the circumferential direction. That is, the connecting portion (81) is spaced away from the connecting portion (83) of a different phase that is adjacent to the connecting portion (81) on the other side in the circumferential direction. Thus, the decrease in the insulation performance can be prevented effectively.

In this embodiment, the lead wire portion (625*b*, 626*a*) included in the connecting portion (84) of the same phase that is adjacent to the connecting portion (83) on the other side in the circumferential direction is bent in the direction along the radial direction, and the lead wire portion (615*a*, 616*b*) included in the connecting portion (83) is bent to the other side in the circumferential direction so as to intersect the radial direction. Therefore, the connecting portion (83) is closer to the connecting portion (84) of the same phase that is adjacent to the connecting portion (83) on the other side in the circumferential direction. That is, the connecting portion (83) is spaced away from the connecting portion (81) of a different phase that is adjacent to the connecting portion (83) on one side in the circumferential direction. Thus, the decrease in the insulation performance can be prevented effectively.

In this embodiment, as described above, the connecting portion (81, 83) is arranged so as not to overlap the fastening hole (23) when viewed in the rotation axis direction by bending the lead wire portion (425*b*, 426*a*, 615*a*, 616*b*) along the plane orthogonal to the rotation axis direction. Therefore, the length of the concentric winding coil (40, 60) in the rotation axis direction does not change even when the lead wire portion (425*b*, 426*a*, 615*a*, 616*b*) is bent. Thus, an increase in the length of the stator (1) in the rotation axis direction can be prevented.

Modified Examples

It should be understood that the embodiment disclosed herein is illustrative but is not limitative in all respects. [0071] For example, in the embodiment described above, description is given of the example in which the present disclosure is applied to the stator 1 in which the concentric winding coils 30 whose coil centers do not coincide with the centers of the magnetic poles are arranged. However, the present disclosure is not limited to this example. The present disclosure is also applicable to a stator in which coils whose coil centers coincide with the centers of the magnetic poles are arranged. The present disclosure is also applicable to a stator in which coils other than the concentric winding coils 30, that is, coils each formed by winding a round wire or the like instead of the flat rectangular conductor wire are arranged.

In the embodiment described above, description is given of the example in which the connecting portion 81 of the U phase and the connecting portion 83 of the W phase are arranged so as not to overlap the fastening hole 23. However, the present disclosure is not limited to this example. The distinction among the U phase, the V phase, and the W phase is provided for convenience. That is, the phases of the connecting portions arranged so as not to overlap the fastening hole 23 are any two phases out of the U phase, the V phase, and the W phase.

In the embodiment described above, description is given of the example in which the number of slots 21 is 96 and the number of fastening holes 23 is 8. However, the present disclosure is not limited to this example. The number of slots 21 may be any number other than 96, and the number of fastening holes 23 may be any number other than 8.

Figure 13:
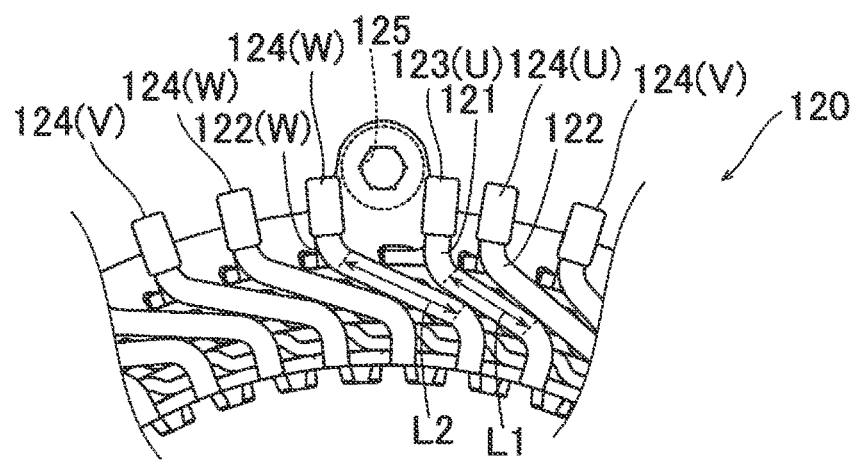
FIG. 13 is a plan of a stator according to a modified example of the embodiment of the present disclosure.

In the embodiment described above, description is given of the example in which the connecting portion 81 (connecting portion 83) is arranged in the state in which its position is shifted in the circumferential direction of the stator core 20 so as not to overlap the fastening hole 23. However, the present disclosure is not limited to this example. For example, as in a stator 120 illustrated as a modified example in FIG. 13, a connecting portion 123 may be arranged so as not to overlap a fastening hole 125 in a state in which the connecting portion 123 (for example, U phase) is arranged so as to extend radially outward similarly to the other connecting portions 124 (U phase, V phase, and W phase) by causing a length L1 of a lead wire portion 121 to differ from a length L2 of a lead wire portion 122.

In the embodiment described above, description is given of the example in which both the connecting portion 81 and the connecting portion 83 are arranged in the state in which their positions are shifted so as not to overlap the fastening hole 23. However, the present disclosure is not limited to this example. If only the connecting portion 81 or the connecting portion 83 overlaps the fastening hole 23 before their positions are shifted, it is only necessary to shift the position of only the connecting portion 81 or the connecting portion 83 that overlaps the fastening hole 23.

In the embodiment described above, description is given of the example in which the first concentric winding coils, the second concentric winding coils, the third concentric winding coils, and the fourth concentric winding coils are connected in parallel. However, the present disclosure is not limited to this example. For example, the first concentric winding coils and the second concentric winding coils may be connected in series, the third concentric winding coils and the fourth concentric winding coils may be connected in series, and the first concentric winding coils and the second concentric winding coils that are connected in series and the third concentric winding coils and the fourth concentric winding coils that are connected in series may be connected in parallel. Further, the first concentric winding coils, the second concentric winding coils, the third concentric winding coils, and the fourth concentric winding coils may be connected in series.

In the embodiment described above, description is given of the example in which the concentric winding coil is formed by concentrically winding the flat rectangular conductor wire. However, the present disclosure is not limited to this example. For example, the coil may be structured by U-shaped conductor segments each having a pair of slot-housed portions (straight portions) and a coil end portion (turning portion) connecting the pair of slot-housed portions to each other. After the plurality of conductor segments are arranged in the slots, the ends of the straight portions are bent in predetermined directions. The windings may be structured by welding the ends of the plurality of straight portions bent in the predetermined directions. Alternatively, the coil may be obtained by alternately forming a plurality of slot-housed portions and a plurality of coil end portions without winding a single conductor wire.

The invention claimed is:

1. A stator, comprising:
a stator core having, on a radially outer side, a fastening hole into which a fastener is inserted; and
a plurality of coils arranged in slots of the stator core and each formed of a conductor wire, wherein
each of the coils includes lead wires at ends of the conductor wire, and
a plurality of connectors, which are portions where the lead wires of the plurality of coils are connected to each other, are arranged so as not to overlap the fastening hole in a state in which a distance between the connector adjacent to the fastening hole in a circumferential direction of the stator core when viewed in a rotation axis direction and the connector adjacent to the connector on a side opposite to the fastening hole side out of the connectors is smaller than a distance between the connectors other than the connector adjacent to the fastening hole.

2. The stator according to claim 1, wherein a phase of the connector arranged so as not to overlap the fastening hole is identical to a phase of the connector adjacent to the connector on the side opposite to the fastening hole side in the circumferential direction of the stator core.

3. The stator according to claim 2, wherein the connectors include a first connector arranged on one side of the fastening hole in the circumferential direction of the stator core so as to be closer to the adjacent connector of the same phase when viewed in the rotation axis direction, and a second connector arranged on the other side of the fastening hole in the circumferential direction of the stator core so as to be closer to the adjacent connector of the same phase when viewed in the rotation axis direction.

4. The stator according to claim 3, wherein a phase of the first connector and a phase of the second connector are different from each other.

5. The stator according to claim 4, wherein the connectors are arranged so as not to overlap the fastening hole when viewed in the rotation axis direction by varying bending conditions of the lead wires of the same phase that are adjacent to each other in the circumferential direction.

6. The stator according to claim 5, wherein
the connectors include a first connector arranged on one side of the fastening hole in the circumferential direction of the stator core and also arranged so as to be closer to the adjacent connector of the same phase when viewed in the rotation axis direction, and
the lead wire included in the connector of the same phase that is adjacent to the first connector on one side in the circumferential direction is bent in a direction along a radial direction, and the lead wire included in the first connector is bent to one side in the circumferential direction so as to intersect the radial direction.

7. The stator according to claim 6, wherein
the connector s include a second connector arranged on the other side of the fastening hole in the circumferential direction of the stator core and also arranged so as to be closer to the adjacent connector of the same phase when viewed in the rotation axis direction, and
the lead wire included in the connector of the same phase that is adjacent to the second connector on the other side in the circumferential direction is bent in a direction along a radial direction, and the lead wire included in the second connector is bent to the other side in the circumferential direction so as to intersect the radial direction.

8. The stator according to claim 3, wherein the connectors are arranged so as not to overlap the fastening hole when viewed in the rotation axis direction by varying bending conditions of the lead wires of the same phase that are adjacent to each other in the circumferential direction.

9. The stator according to claim 8, wherein
the connectors include a first connector arranged on one side of the fastening hole in the circumferential direction of the stator core and also arranged so as to be closer to the adjacent connector of the same phase when viewed in the rotation axis direction, and
the lead wire included in the connector of the same phase that is adjacent to the first connector on one side in the circumferential direction is bent in a direction along a radial direction, and the lead wire included in the first connector is bent to one side in the circumferential direction so as to intersect the radial direction.

10. The stator according to claim 9, wherein
the connectors include a second connector arranged on the other side of the fastening hole in the circumferential direction of the stator core and also arranged so as to be closer to the adjacent connector of the same phase when viewed in the rotation axis direction, and
the lead wire included in the connector of the same phase that is adjacent to the second connector on the other side in the circumferential direction is bent in a direction along a radial direction, and the lead wire included in the second connector is bent to the other side in the circumferential direction so as to intersect the radial direction.

11. The stator according to claim 8, wherein the connectors are arranged so as not to overlap the fastening hole when viewed in the rotation axis direction by bending the lead wires along a plane orthogonal to the rotation axis direction.

12. The stator according to claim 2, wherein the connectors are arranged so as not to overlap the fastening hole when viewed in the rotation axis direction by varying bending conditions of the lead wires of the same phase that are adjacent to each other in the circumferential direction.

13. The stator according to claim 12, wherein
the connectors include a first connector arranged on one side of the fastening hole in the circumferential direction of the stator core and also arranged so as to be closer to the adjacent connector of the same phase when viewed in the rotation axis direction, and
the lead wire included in the connector of the same phase that is adjacent to the first connector on one side in the circumferential direction is bent in a direction along a radial direction, and the lead wire included in the first connector is bent to one side in the circumferential direction so as to intersect the radial direction.

14. The stator according to claim 13, wherein
the connectors include a second connector arranged on the other side of the fastening hole in the circumferential direction of the stator core and also arranged so as to be closer to the adjacent connector of the same phase when viewed in the rotation axis direction, and
the lead wire included in the connector of the same phase that is adjacent to the second connector on the other side in the circumferential direction is bent in a direction along a radial direction, and the lead wire included in the second connector is bent to the other side in the circumferential direction so as to intersect the radial direction.

15. The stator according to claim 12, wherein the connectors are arranged so as not to overlap the fastening hole when viewed in the rotation axis direction by bending the lead wires along a plane orthogonal to the rotation axis direction.

16. The stator according to claim 1, wherein
a plurality of the fastening holes are provided equiangularly in the stator core when viewed in the rotation axis direction, and
the number of the plurality of the fastening holes is a divisor of a number obtained by dividing the number of the plurality of connectors by 2.

17. The stator according to claim 1, wherein the connectors are arranged so as not to overlap the fastening hole when viewed in the rotation axis direction by varying bending conditions of the lead wires of the same phase that are adjacent to each other in the circumferential direction.

18. The stator according to claim 17, wherein
the connectors include a first connector arranged on one side of the fastening hole in the circumferential direction of the stator core and also arranged so as to be closer to the adjacent connector of the same phase when viewed in the rotation axis direction, and
the lead wire included in the connector of the same phase that is adjacent to the first connector on one side in the circumferential direction is bent in a direction along a radial direction, and the lead wire included in the first connector is bent to one side in the circumferential direction so as to intersect the radial direction.

19. The stator according to claim 18, wherein
the connectors include a second connector arranged on the other side of the fastening hole in the circumferential direction of the stator core and also arranged so as to be closer to the adjacent connector of the same phase when viewed in the rotation axis direction, and
the lead wire included in the connector of the same phase that is adjacent to the second connector on the other side in the circumferential direction is bent in a direction along a radial direction, and the lead wire included in the second connector is bent to the other side in the circumferential direction so as to intersect the radial direction.

20. The stator according to claim 17, wherein the connectors are arranged so as not to overlap the fastening hole when viewed in the rotation axis direction by bending the lead wires along a plane orthogonal to the rotation axis direction.

* * * * *